United States Patent
Hurst

(10) Patent No.: US 10,723,568 B2
(45) Date of Patent: Jul. 28, 2020

(54) BOTTOM UP LUMBER STACKER

(71) Applicant: Marlin J. Hurst, New Holland, PA (US)

(72) Inventor: Marlin J. Hurst, New Holland, PA (US)

(*) Notice: Subject to any disclaimer, the term of this patent is extended or adjusted under 35 U.S.C. 154(b) by 15 days.

(21) Appl. No.: 15/995,840

(22) Filed: Jun. 1, 2018

(65) Prior Publication Data

US 2018/0346263 A1 Dec. 6, 2018

Related U.S. Application Data

(60) Provisional application No. 62/514,225, filed on Jun. 2, 2017.

(51) Int. Cl.
*B65G 57/30* (2006.01)
*B65G 57/18* (2006.01)
*B65G 59/06* (2006.01)

(52) U.S. Cl.
CPC .......... *B65G 57/302* (2013.01); *B65G 57/18* (2013.01); *B65G 57/308* (2013.01); *B65G 59/063* (2013.01); *B65G 2201/0282* (2013.01)

(58) Field of Classification Search
CPC .... B65G 57/18; B65G 57/302; B65G 57/308; B65G 2201/0282; B65G 57/30; B65G 57/301; B65G 57/303
See application file for complete search history.

(56) References Cited

U.S. PATENT DOCUMENTS

| | | | | |
|---|---|---|---|---|
| 2,828,871 | A * | 4/1958 | Bardsley | B65G 57/06 414/791.8 |
| 2,950,815 | A * | 8/1960 | Oberg | B21C 33/00 198/851 |
| 3,057,486 | A * | 10/1962 | Moulthrop | B65G 57/302 414/795.3 |
| 3,113,683 | A * | 12/1963 | Von Gal, Jr. | B65G 59/026 414/796.8 |
| 3,190,466 | A * | 6/1965 | Hostetier | B65G 59/063 414/788.8 |
| 3,245,557 | A * | 4/1966 | Maramonte | B65G 57/24 414/792.1 |
| 3,363,781 | A * | 1/1968 | Magnetti | B65G 57/303 414/788.8 |
| 3,519,119 | A * | 7/1970 | Hershey, Jr. | A21B 3/07 198/357 |

(Continued)

*Primary Examiner* — Gregory W Adams
(74) *Attorney, Agent, or Firm* — Miller Law Group, PLLC

(57) ABSTRACT

A lumber stacking machine has a stacking mechanism forming a stack of lumber from the bottom upwardly. The stacking mechanism includes a lift mechanism formed with a plurality of stacking fingers that lift a layer of lumber vertically above a conveyor. With the formation of a new layer of lumber, the stacking mechanism moves below the new layer with the stacking fingers retracting to pass by the new layer and resting the growing stack of lumber on top of the new layer, and then extending below the new layer to raise the entire stack to allow another new layer to be formed. Stops are provided to control the movement of the individual boards from the infeed station into the stacking station and also to control movement of the new layer beyond the stacking station. Two conveyors cooperate to move the lumber with an overlap in the stacking station.

10 Claims, 15 Drawing Sheets

(56) References Cited

U.S. PATENT DOCUMENTS

| | | | | |
|---|---|---|---|---|
| 3,682,290 A * | 8/1972 | Von Gal, Jr. | B65G 47/088 | 198/418.5 |
| 3,765,546 A * | 10/1973 | Westerling | B65G 59/062 | 414/795.2 |
| 3,884,366 A * | 5/1975 | Leenaards | B65G 57/303 | 414/795.2 |
| 4,221,519 A * | 9/1980 | Nord | B65G 57/302 | 414/397 |
| 4,222,311 A * | 9/1980 | Jaton | B65H 31/3054 | 414/795.2 |
| 4,273,490 A * | 6/1981 | James | B65G 57/303 | 414/789.9 |
| 4,352,617 A * | 10/1982 | Sakai | B65G 57/303 | 414/790.1 |
| 4,439,098 A * | 3/1984 | Rienks | B65G 57/00 | 271/212 |
| 4,508,483 A * | 4/1985 | Hessling | B65G 47/54 | 414/797.5 |
| 4,764,074 A * | 8/1988 | Postigo | B65G 57/303 | 414/789.1 |
| 5,020,966 A * | 6/1991 | Kiker | B65G 60/00 | 414/795.2 |
| 5,033,935 A * | 7/1991 | Decrane | B65G 59/063 | 414/798.1 |
| 5,645,392 A * | 7/1997 | Leichty | B65G 59/063 | 414/416.01 |
| 5,993,145 A | 11/1999 | Lunden | | |
| 6,769,534 B2 * | 8/2004 | Lee | H05K 13/0061 | 198/817 |
| 7,651,314 B2 | 1/2010 | Hogue et al. | | |
| 7,717,665 B2 * | 5/2010 | Jenkins | B65G 57/302 | 187/360 |
| 8,613,585 B2 | 12/2013 | Johansson et al. | | |
| 2010/0104412 A1 * | 4/2010 | Abascal Albizu | A22C 7/0053 | 414/795.2 |

\* cited by examiner

BOTTOM UP LUMBER STACKER

CROSS-REFERENCE TO RELATED APPLICATIONS

This application claims domestic priority on U.S. Provisional Patent Application Ser. No. 62/514,225, filed on Jun. 2, 2017, the content of which is incorporated herein by reference.

FIELD OF THE INVENTION

This invention relates generally to machines for stacking lumber, and, more particularly, to a lumber stacking machine that stacks lumber from the bottom of the stack instead of on top of the stack.

BACKGROUND OF THE INVENTION

Stacking machines are utilized primarily in the lumber industry to collect individual boards, although other products such as plywood, stakes, other wood products, drywall, etc. are also stacked, to facilitate shipping of the product to a distributor or retailer. Lumber, particularly boards or plywood used in the pallet industry, is typically produced in lengths between 2 feet and 6 feet, with thicknesses ranging from about ⅜ inch to 2.5 inches, and widths that range between 1.5 inches to about 48 inches. After the boards are sawn into the proper length, width and thickness, the lumber is generally gathered into layers, sometimes referred to as courses, and then supplied to a stacker where the boards are placed into stacked packages that are typically between 12 and 128 or more layers high.

Lumber stackers are sturdy machines usually formed from steel with conveying devices that move the boards to a stacking area or station. Preferably, lumber stackers are operable at relatively high speeds so that the sawn lumber can be accumulated and then shipped to a remote point for sale or for further processing. Preferably, the stacking machine will be automated to receive the individual units of product and place the product into a stack to a desired size, and then discharge the stack to a remote location for shipment. Conventional stacking machines create a stack from the top of the accumulated stack, typically by utilizing a set of stacker arms to raise a course or layer of lumber. The stacker arms are then extended to a stacking station where the respective courses of lumber are collected into a stack. Once a course of lumber has been set on top of the accumulated stack, the stacker arms retreat to pick up the next course. This process is repeated until a stack of lumber of desired size has been created, whereupon the completed stack can then be bundled and shipped, or sent for further processing.

In addition, conventional stackers have not provided the ability to provide significant variation in the size of the stack in terms of the length of the individual boards being assembled into the stack. Although the production of individual boards of a smaller length is usually faster than longer boards, the conventional stacking machines have difficulty in accommodating the shorter boards and/or speeding up the stacking process. Stacking speeds of approximately 20 courses or layers of lumber per minute are often needed to match the speed of production of smaller boards.

The lumber stacker disclosed in U.S. Pat. No. 5,993,145, granted to Sidney Lunden on Nov. 30, 1999, provides for the building of the stack from the top of the stack by the placement of the individual course by stacker arms connected in an eccentric drive mechanism. Rocker arms provide stops for the building of the individual courses of lumber before the stacker arms place the accumulated course onto the top of the stack that is being built. In U.S. Pat. No. 7,651,314, granted on Jan. 26, 2010, to Gary Hogue, et al, the stacker arms are movable in a linear manner in conjunction with linear actuators that alternate the placement of different pairs of stacking arms to deliver a course of boards on top of the stack being formed.

The stacking mechanism disclosed in U.S. Pat. No. 8,613,585, issued to Jan Johannson, et al, on Dec. 24, 2013, is somewhat more complex than the stacking mechanism disclosed in the Hogue patent, but nevertheless builds the stack of lumber through the placement of the individual courses of lumber on top of the stack being built by alternating stacking arms. The use of alternating stacking arms increases the speed of operation of the stacking machine, but significant increases the manufacturing and operating cost of such stacking machines.

Accordingly, it would be desirable to provide a lumber stacking machine that can provide stacking speeds that will accommodate the production of different lengths of lumber at high operating speeds, while maintaining lower production costs for the stacking machine.

SUMMARY OF THE INVENTION

It is an object of this invention to overcome the disadvantages of the known prior art by providing a lumber stacking machine in which the lumber is stacked from the bottom upwardly.

It is another object of this invention to provide a stacking mechanism that receives and stacks pre-cut lumber pieces in a stack with new layers added to the bottom of the growing stack.

It is a feature of this invention that the stacking members have retractable stacking fingers that hold a stack of lumber above a layer of lumber being formed at a stacking station below the elevated stack of lumber.

It is another feature of this invention that the stacking fingers are positioned on opposing sides of the stacking station.

It is an advantage of this invention that the stacking fingers retract to pass below a newly formed layer of lumber to be added to the growing stack of lumber placed on top of the newly formed layer of lumber.

It is another advantage of this invention that the stacking fingers extend outwardly once positioned below the newly formed layer of lumber to permit the raising of the growing stack of lumber that includes the newly formed layer.

It is still another feature of this invention that the stacking mechanism includes a drive mechanism that operates to move the stacking mechanism vertically in a cyclical manner, along with the extension and retraction of the stacking fingers.

It is still another advantage of this invention that the stacking machine includes a second conveyor run that extends from the stacking station to a staging station to receive a fully formed stack of lumber from the stacking mechanism.

It is yet another feature of this invention that the stacking machine includes a spacing adjustment mechanism that affects movement of the conveyor runs.

It is yet another advantage of this invention that the spacing adjustment mechanism accommodates different length dimensions of the lumber being stacked by the stacking mechanism.

It is still another feature of this invention that the stacking station includes a pair of vertical stops that are selectively movable to engage lumber moving into the stacking station.

It is still another advantage of this invention that the vertical stops are movable between an inboard position to stop the movement of boards past the stacking station, and an outboard position in which a fully completed stack of lumber is permitted to pass along the second conveyor run to the staging station.

It is a further feature of this invention that the stacking machine includes an infeed station having a pair of opposing vertically movable stops.

It is a further advantage of this invention that the vertically movable stops in the infeed station are selectively operable to control the movement of lumber from the infeed station into the stacking station.

It is still a further feature of this invention that the first and second conveyor runs overlap within the stacking station, the stacking machine including a relief mechanism that lowers the first conveyor run when the stacking mechanism lowers to position the stacking fingers beneath the newly formed layer of lumber.

It is still a further advantage of this invention that the relief mechanism allows the growing stack of lumber to rest on the second conveyor run when the growing stack of lumber is placed on top of the newly formed layer of lumber.

It is yet another feature of this invention that the first conveyor run is operated continuously, while the second conveyor run is selectively operated intermittently.

It is yet another advantage of this invention that the stacking machine having a bottom-up stacking mechanism is capable of improved speeds of operation over the known prior art lumber stacking mechanisms.

It is a further object of this invention to provide a lumber stacking machine having a stacking mechanism that builds a stack of lumber from the bottom, which is durable in construction, inexpensive of manufacture, carefree of maintenance, easy to assemble, and simple and effective in use.

These and other objects, features and advantages are accomplished according to the instant invention by providing a lumber stacking machine having a stacking mechanism that forms a stack of lumber from the bottom upwardly. The stacking mechanism includes a lift mechanism formed with a plurality of stacking fingers that lift a layer of lumber vertically above a conveyor. With the formation of a new layer of lumber, the stacking mechanism moves below the newly formed layer with the stacking fingers retracting to pass the newly formed layer and resting the growing stack of lumber on the newly formed layer, and then extending below the new layer to raise the entire stack to allow another new layer to be formed below the elevated stack. Stops are provided to control the movement of the individual boards from the infeed station into the stacking station and also to control movement of the new layer beyond the stacking station. Two conveyors cooperate to move the lumber with an overlap in the stacking station.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENTS

Figure 1:
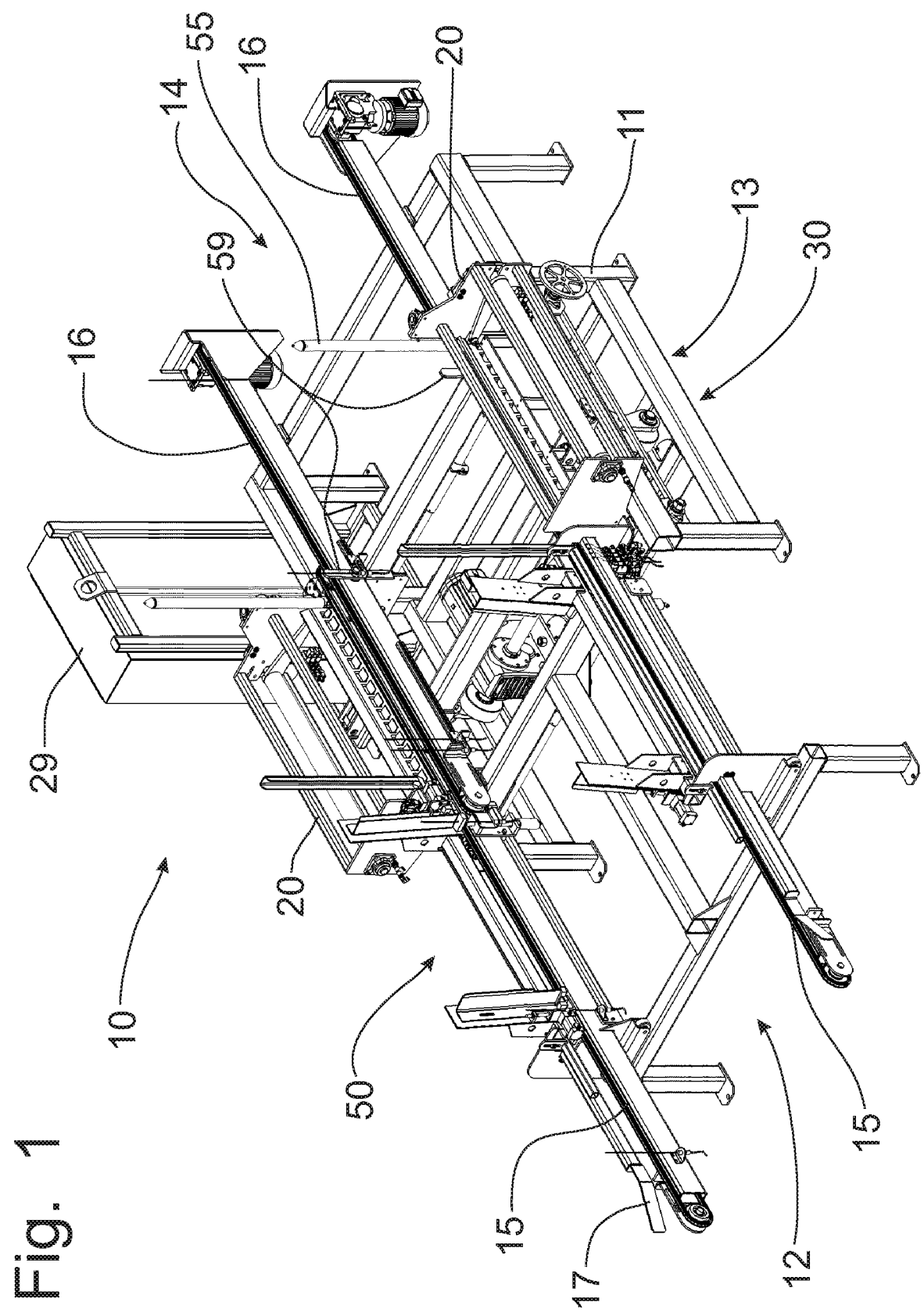
FIG. 1 is a perspective view of a lumber stacking machine incorporating the principles of the instant invention.

Referring now to FIGS. 1-5, a lumber stacking machine incorporating the principles of the instant invention can best be seen. The lumber stacking machine 10 is an elongated apparatus that has a frame 11 supporting an infeed station 12, a central stacking station 13 and a staging station 14, operable to create a stack of product, typically lumber or plywood, which can be created in different lengths and widths. The lumber is created by a sawing or milling machine (not shown) and deposited onto the infeed conveyor chains 15 at the infeed station 12. The chain conveyors 15 move the deposited lumber toward the stacking station 13 at the center of the machine. Typically, the individual boards will overlap the infeed conveyor chains 15, and also the staging area conveyor chains 16.

The stacking station 13 includes a pair of laterally opposing stacker members 20 that are supported for movement toward and away from one another to accommodate different lengths of boards from the infeed station 12. One skilled in the art will recognize that the lateral spacing of both the infeed conveyor 15 and the staging conveyor 16 are also positionally adjustable with the stacking members 20 to allow the receipt of different lengths of boards, and the movement of different corresponding lengths of competed stacks of boards. A control box 29 is mounted on the frame 11 to house the electrical and hydraulic controls, as well as the microprocessor for operating the lumber stacking machine 10 in an automated manner.

Each stacking member 20 is formed similarly and operates identically to build a stack of lumber from the bottom of the stack, as opposed to the top of the stack as is conventional in the industry. The construction of the stacking members 20 are best seen in the cross-sectional views of FIGS. 8-11. The stacker member 20 includes a fixed frame 21 which supports a stack holder 22 for reciprocal vertical movement relative to the frame 11 of the stacking machine 10 and the frame 21 of the stacker member 20. The stack holder 22 also includes a subframe 23 that is formed with a plurality of finger openings 24 for the linear lateral movement of corresponding stacking fingers 25. The stacking fingers 25 are connected to a linear actuator 27 that moves the stacking fingers laterally in a manner to be described in greater detail below.

The subframes 23 of the stack holders 22 are connected to an eccentric drive mechanism 30 that affects the vertical reciprocating movement of the stack holders 22. The drive mechanism 30 is rotatably powered through a variable speed motor 32 that can be operably controlled by a processor (not shown) which drives the eccentric 33 on both lateral sides of the lumber stacking machine 10. Each eccentric 33 includes an arm 34 that rotates with the eccentric 33 to move vertically a lift beam 39 that spans between the two arms 34. Each subframe 23 is supported on the lift beam 39 and move vertically with the lift beam 39 a distance corresponding to the offset of the arm 34 from the center of the eccentric 33. Phenolic slide pads guide the vertical movement of the subframe 23 relative to the frame 21 of the stacking members 20.

The drive shaft 31 delivers rotational power from the motor 32 to the eccentric drives 33 on both lateral sides of the lumber stacking machine 10. A star wheel 37 having a plurality of radially extending arms is mounted on the drive shaft 31 for the processor to monitor the position of the eccentrics 33. Adjacent the star wheel 37 are a pair of sensors (not shown) that track the position of the star wheel 37. An upper sensor counts the number of arms passing the upper sensor to track the position of the eccentric drives 33, and thus, the position of the stack holders 22 and stack fingers 25. A lower sensor senses the proximity of a single long arm of the star wheel 37 to identify the home position, i.e. the lowermost position, of the eccentric drives 33.

The stacking fingers 25 move laterally through the finger openings 24 as powered by the linear actuators 27, preferably hydraulic cylinders. The stacking fingers 25 and the actuators 27 are mounted on the respective subframe 23 so that they too are vertically movable with the stack holder 22. In addition, the stacking fingers 25 are movable vertically with respect to the subframe 35 within and outside of the finger openings 24. The frame 21 of the stacking members 20 carries a rock shaft 35 supported by bearings to permit rotational movement. Each rock shaft 35 is connected to the subframe 23 of the stack holder 22 by connecting arms 36 to provide stability for the vertical movement of the stack holders 22, specifically to keep the subframe 23 from twisting as the lift beam 39 causes vertical movement of the subframes 23.

Figure 11:
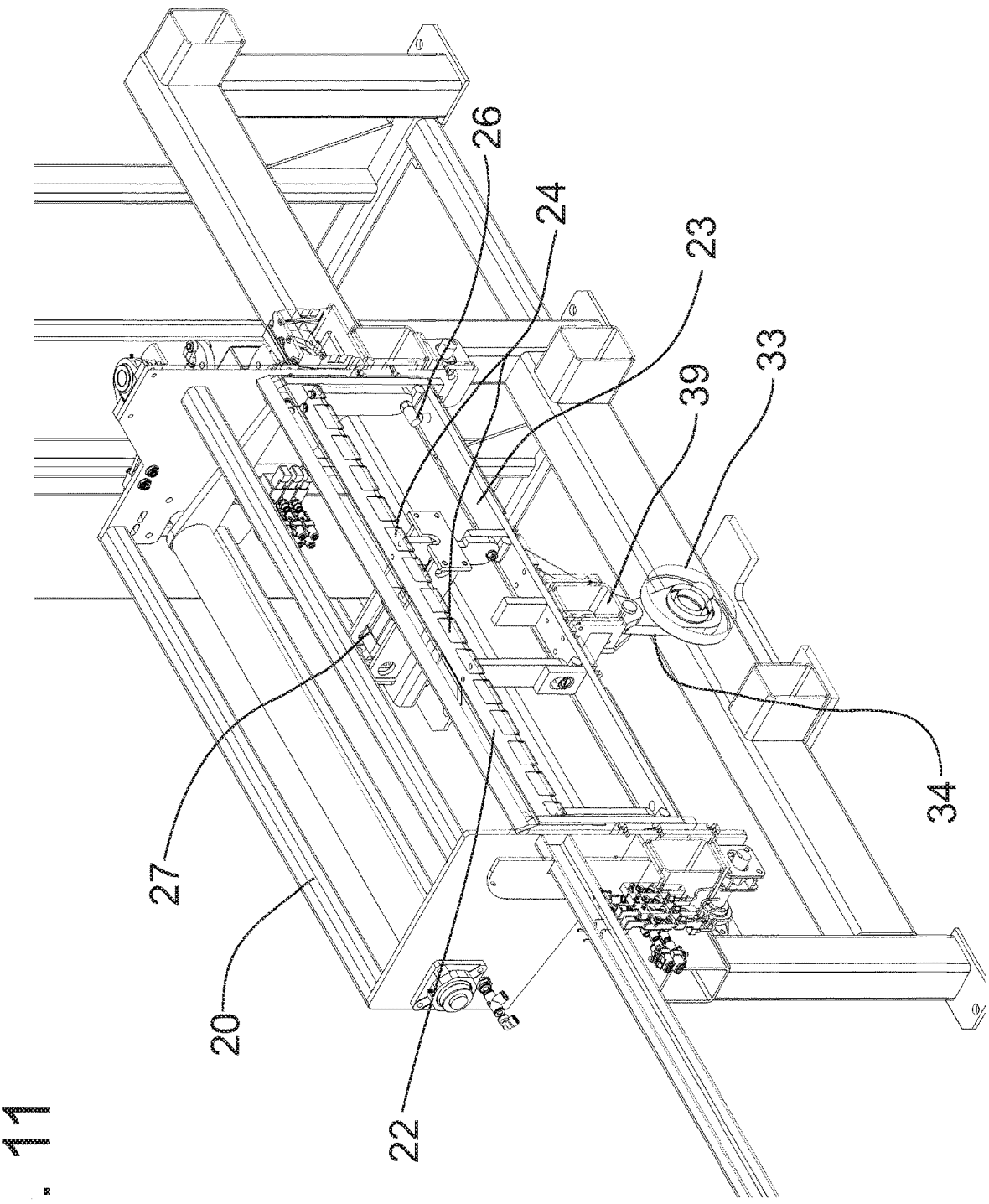
FIG. 11 is a partial longitudinal cross-sectional view similar to that of FIG. 10, but with the inside portion of the stacker member removed to facilitate viewing the vertical drive for the stacker members.

As the stack holders 22 move vertically, the inboard ends of the connecting arms 36 move with the subframe 23 of the stack holders 22 while the outboard ends are fixed to the rock shaft 35 and cause the rock shaft 35 and the connecting arms to rotate. A proximity switch 26, best seen in FIG. 11, is carried by the subframe 23 and cooperable with the mating part of the switch 26 carried by the stacking fingers 25. When the contact between the mating parts of the switch 26 is broken, the linear actuators 27 pull the stacking fingers 25 outboard, away from the finger openings 24. Conversely, when contact between the mating parts of the switch 26 is re-established, the linear actuator 27 extends the stacking fingers 25 back through the finger openings 24.

Figure 8:
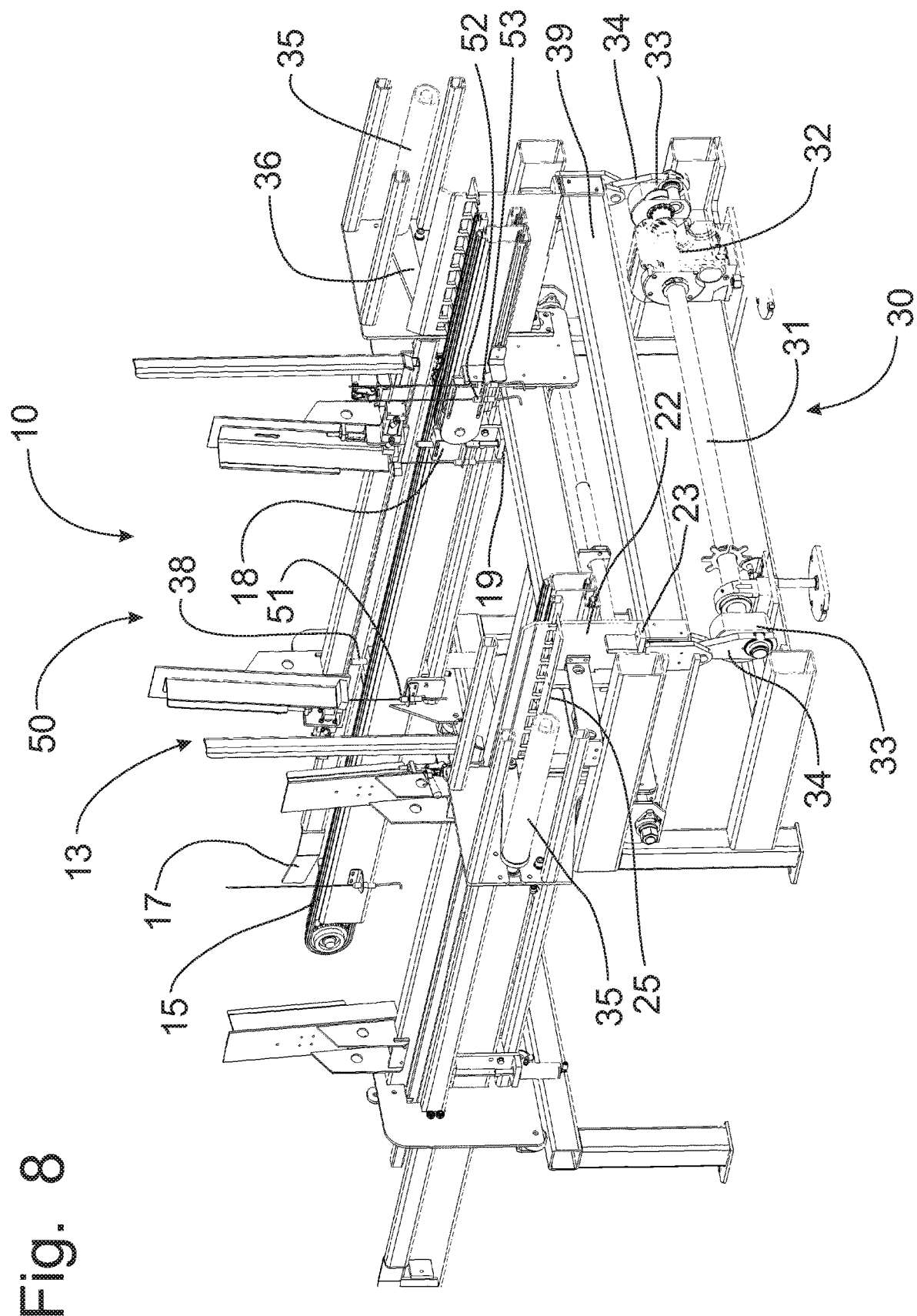
FIG. 8 is a partial, enlarged perspective cross-sectional view of the lumber stacking machine which also corresponds to lines 7-7 of FIG. 5 to depict the drive mechanisms for the movements of the stacker members.
Figure 9:
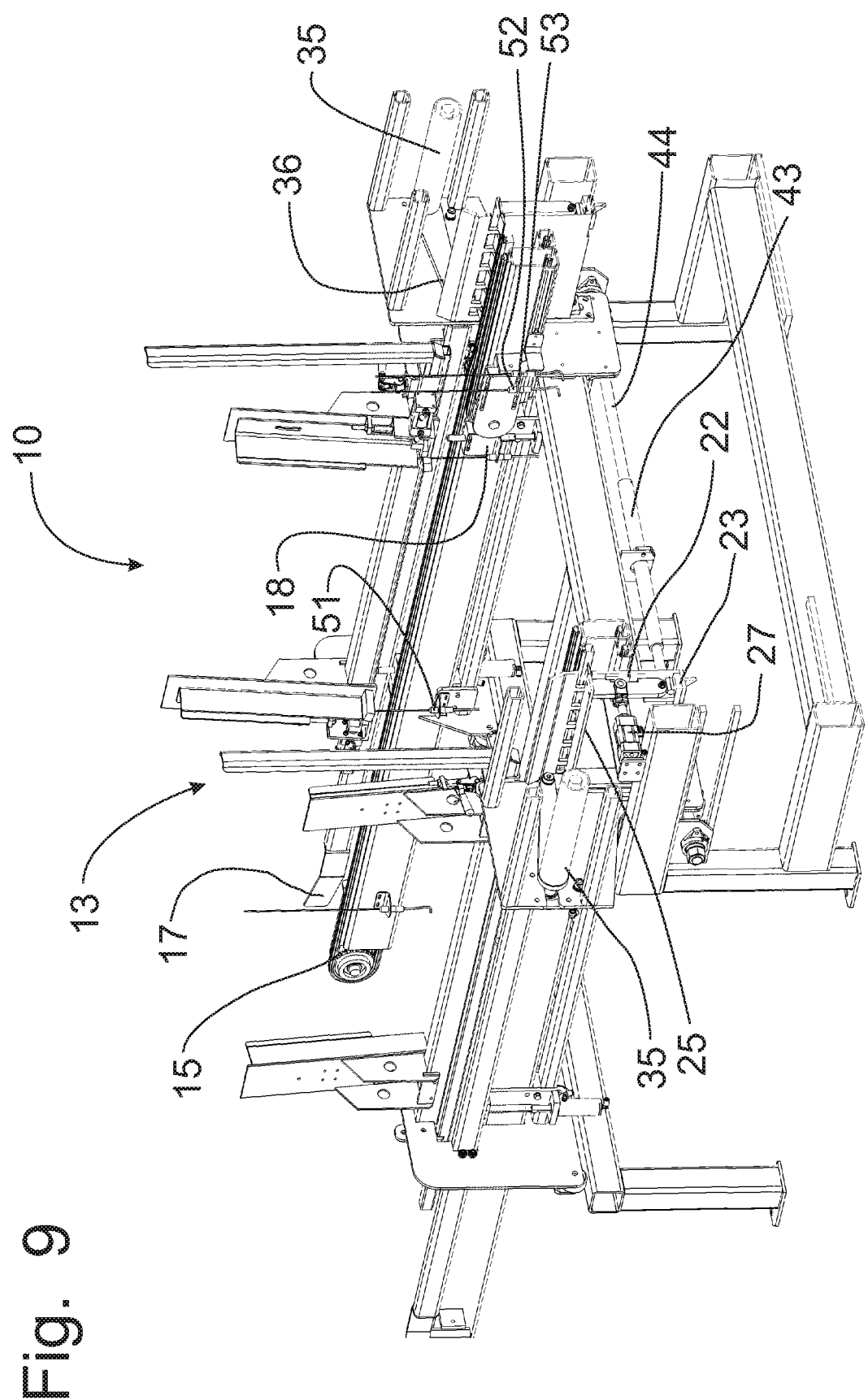
FIG. 9 is a partial, enlarged perspective cross-sectional view of the lumber stacking machine corresponding to lines 9-9 of FIG. 4 to show the linear drive for movement of the stacking fingers.
Figure 12:
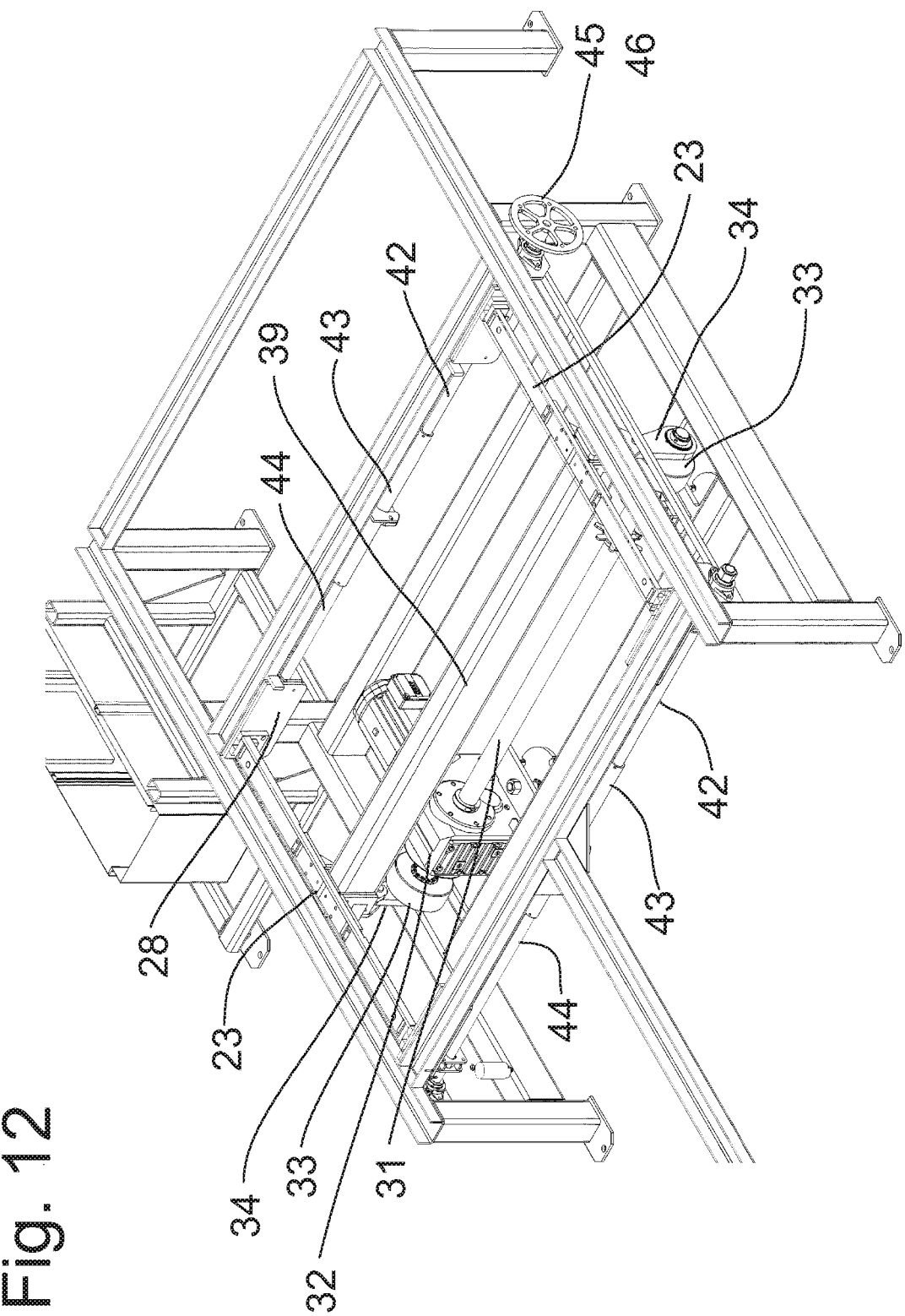
FIG. 12 is a partial, enlarged horizontal cross-sectional view shown in perspective to depict the pacing adjustment mechanism for the stacking station of the lumber stacking machine.

A lateral spacing adjustment mechanism 40 is best seen in FIGS. 8, 9 and 12. Threaded rods 42, 44 interconnect the opposing stacking members 20 with a central coupler member 43 supported in the center of machine 10 and operably connected to both threaded rods 42, 44 so that all three components 42, 43 and 44 rotate together. A crank wheel 45 is mounted on one of the proximal threaded rods 42 to cause selective rotation thereof to change the lateral spacing of the stacking members 20. An endless chain drive 46 is entrained around a drive sprocket associated with the crank wheel 45 and also around a corresponding driven sprocket on the second proximal threaded rod 42. Thus, when the first proximal threaded rod 42 is rotated by turning the crank wheel 45, the second proximal threaded rod 42 is also rotated a corresponding amount.

Figure 6:
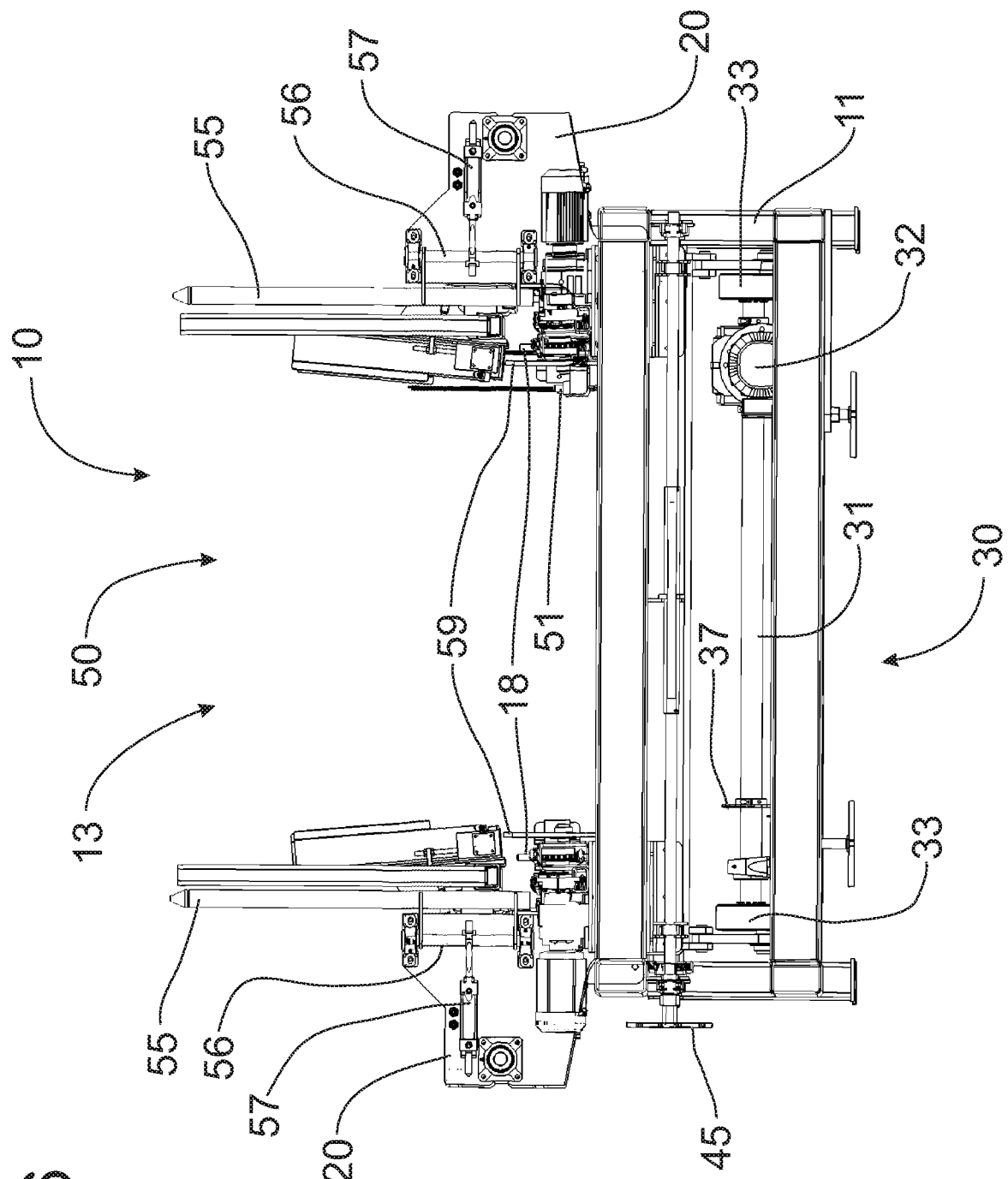
FIG. 6 is a partial cross-sectional view of the lumber stacking machine corresponding to lines 6-6 of FIG. 5.
Figure 7:
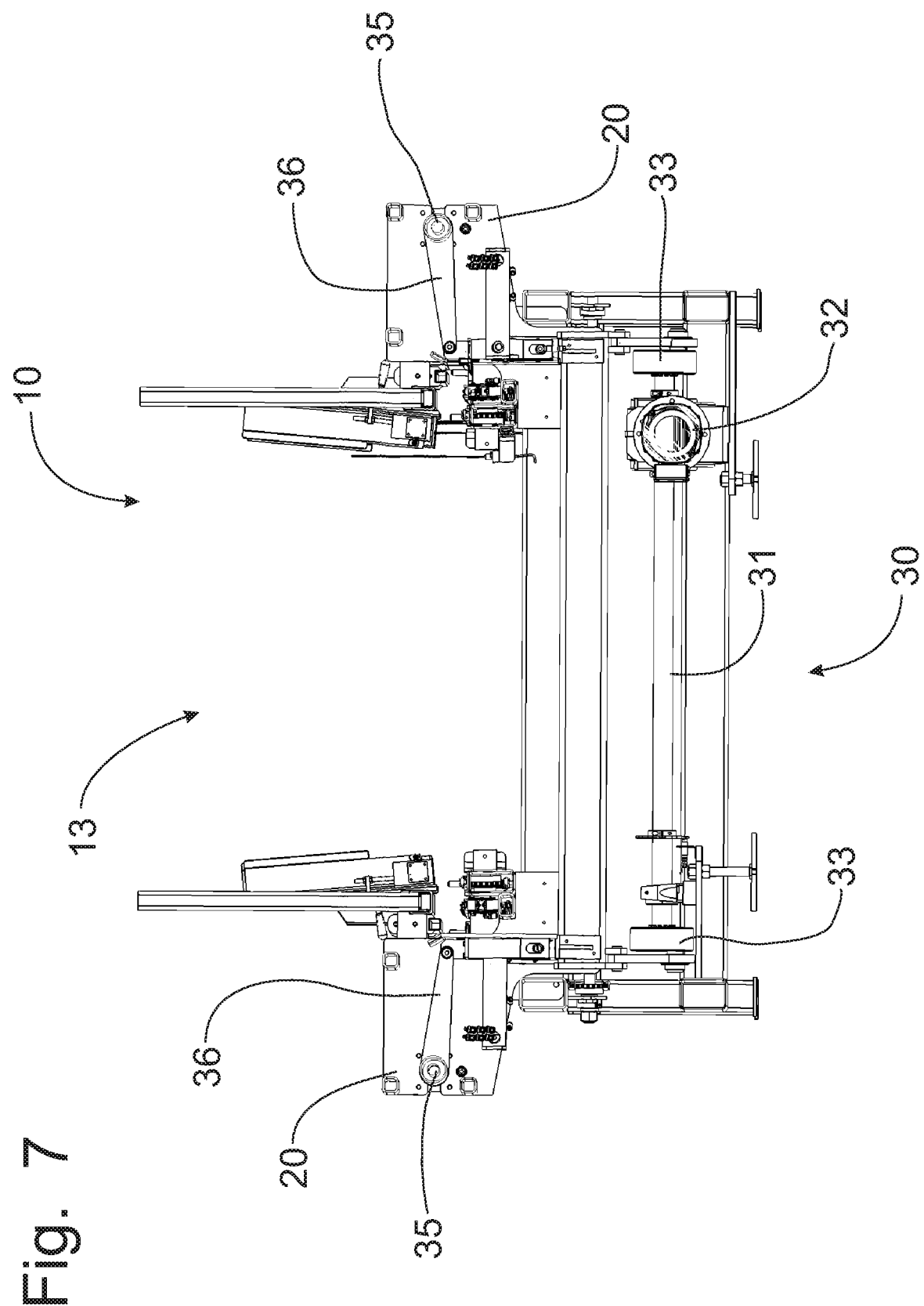
FIG. 7 is a partial cross-sectional view of the lumber stacking machine corresponding to lines 7-7 of FIG. 5 to show the drive mechanism for the vertical movement of the stacking members.

As is best seen in FIG. 6, each threaded rod 42, 44 carries a threaded nut 48 that is affixed to a shuttle carriage 49 on which each respective stacking member 20 is supported. Each shuttle carriage 49 is supported on a corresponding transverse frame member 11 and separated by phenolic slide pads to facilitate the movement of the shuttle carriages 49 over the transverse frame members. Thus, the rotation of the threaded rods 42, 44, coupled together by the central coupler member 43 cause the threaded nut 48 to translate along the length of the threaded rods 42, 44 and cause the lateral movement of the respective shuttle carriages simultaneously toward or away from one another, one of the threaded rods 42 having right-hand threads while the other threaded rod has left-hand threads.

Figure 2:
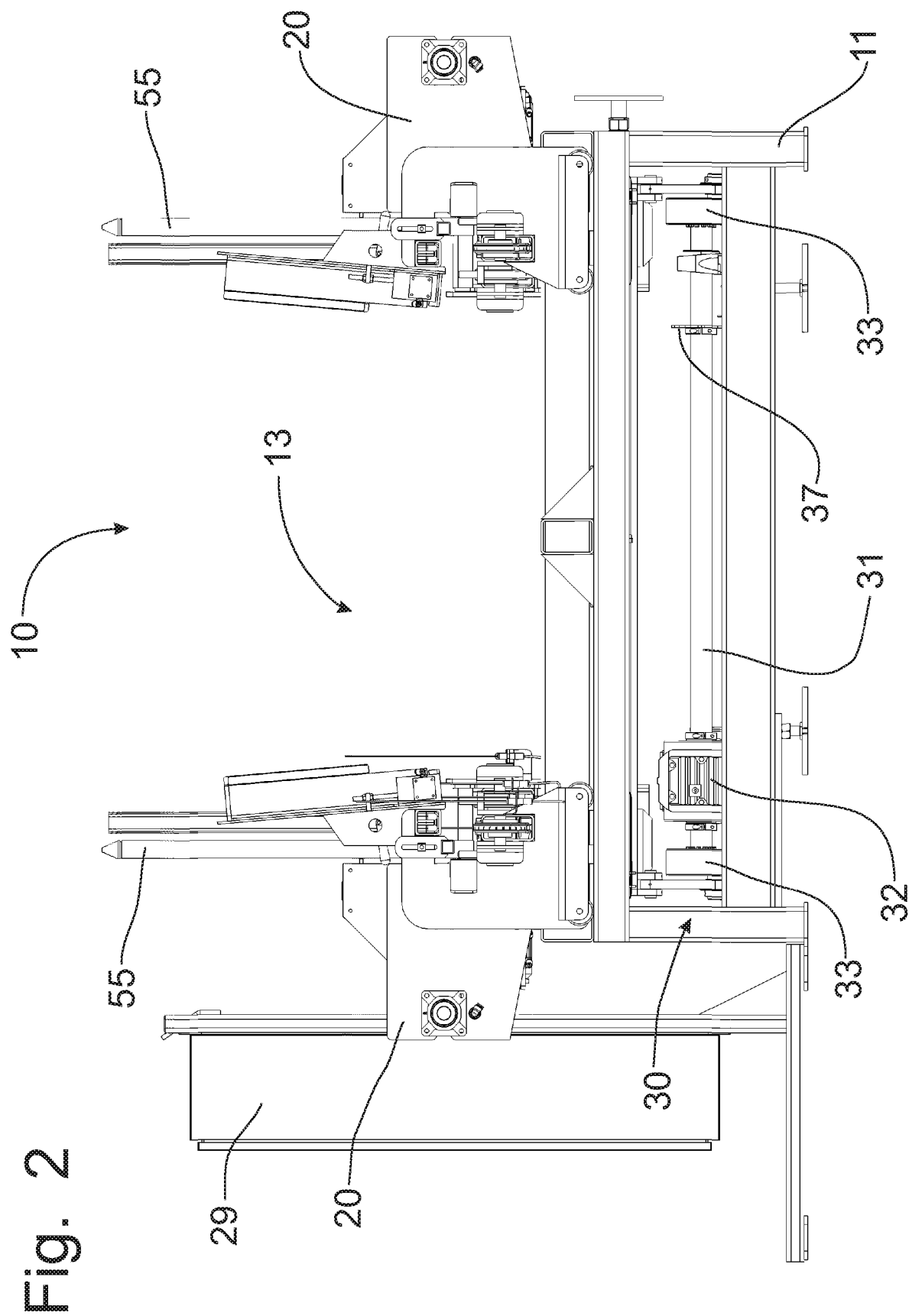
FIG. 2 is an enlarged end view of the lumber stacking machine shown in FIG. 1, looking into the staging station of the machine.
Figure 3:
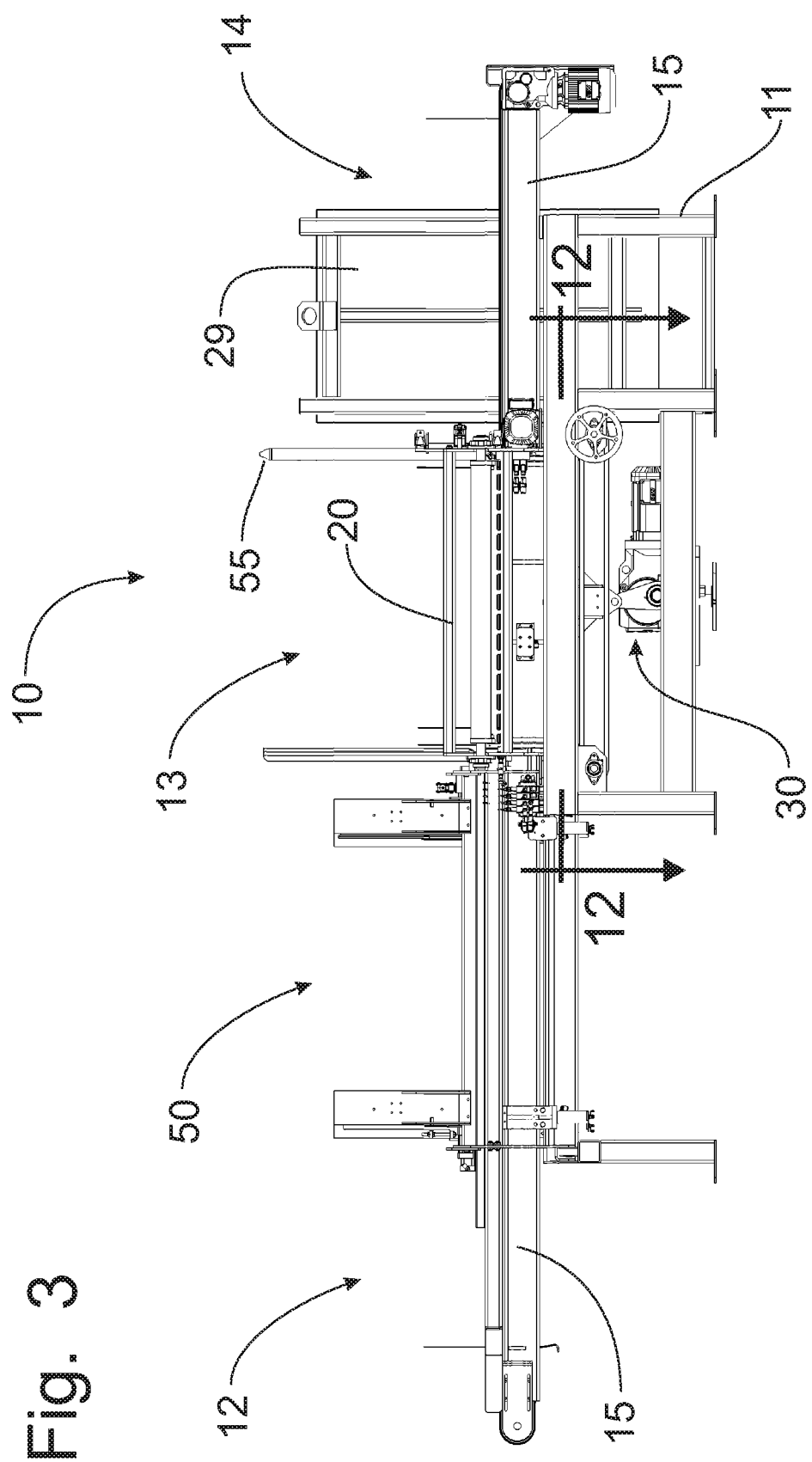
FIG. 3 is a front elevational view of the stacking machine with the infeed station to the left of the drawing and the staging station to the right.
Figure 4:
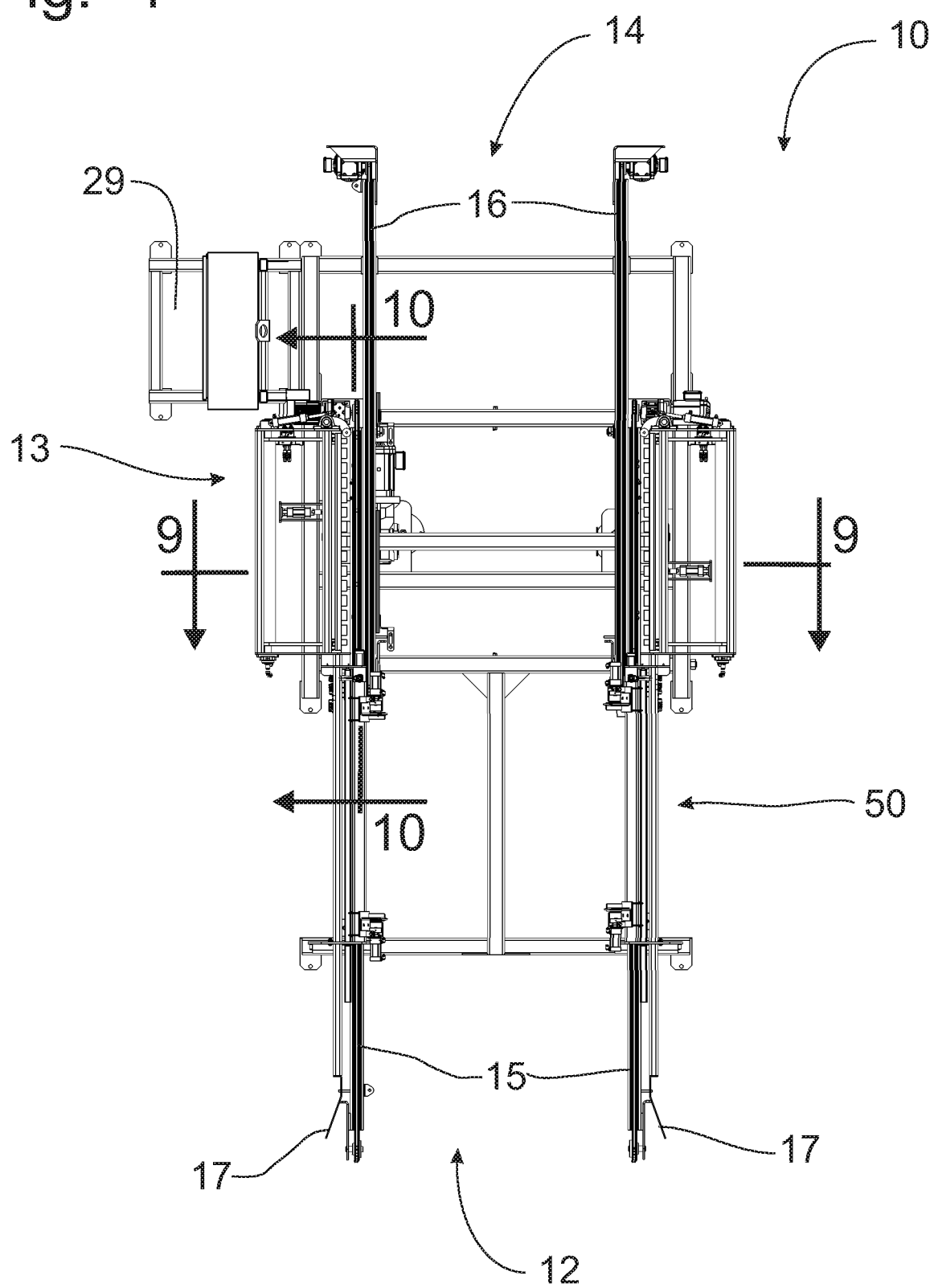
FIG. 4 is a top plan view of the lumber stacking machine.
Figure 5:
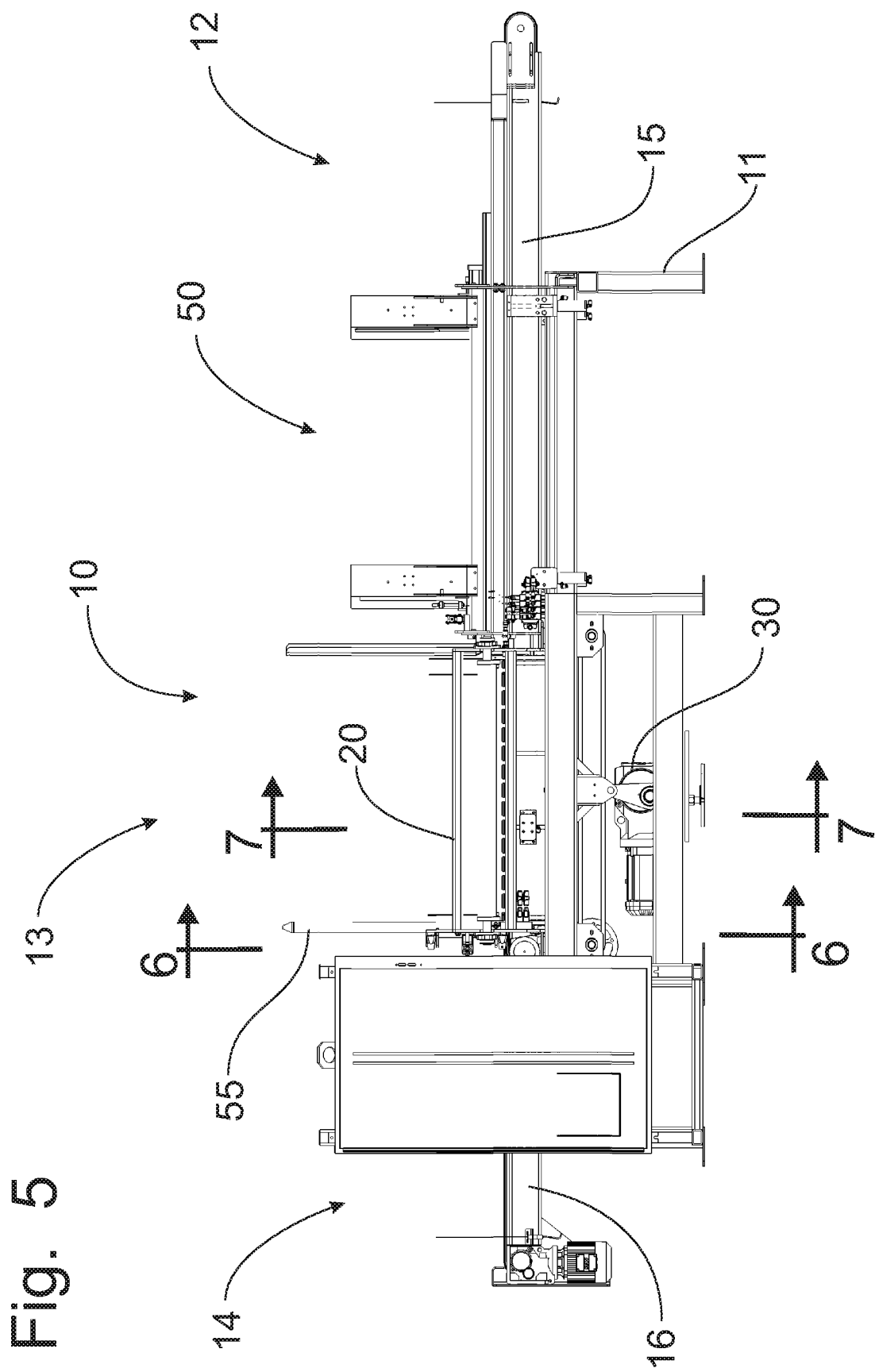
FIG. 5 is a rear elevational view of the lumber stacking machine opposite of the view of FIG. 3.

One skilled in the art will realize that the corresponding lateral spacings of the two chain conveyors 15, 16 are also changed according to the spacing of the stacking members 20. While the shuttle carriages 49 specifically carry the stacking members 20, the respective conveyor runs 15, 16 also move with the stacking members 20. In FIGS. 1 and 2, the movable support of the distal ends of the chain conveyors 15, 16 can best be seen. The distal ends of the infeed conveyor 15 are supported by rollers on a transverse frame member. The distal ends of the staging conveyor 16 are supported on phenolic slide pads carried by a transverse frame member. One skilled in the art will also recognize that the use of the lift beam 39 to transfer vertical motion from the eccentric drive mechanism 30 to the stack holders 22, eliminates the need to have adjustment in the drive shaft 31. Since the stacking members 20 are also slidably supported on the lift beam 39 by plastic slide blocks, the rotatable portions of the eccentric drive mechanism 30 remain fixed in place.

Referring now to FIGS. 1-5, the infeed station 12 can best be seen. The infeed station 12 includes a first chain conveyor 15 that is preferably operated continuously to deliver product units, such as boards, toward the stacking station 13. Above the transversely opposed runs of the first chain conveyor 15, guides 17 are mounted to center the boards on the first conveyor 15 as the boards are received into the infeed station 12 from a remote supply of boards. The constantly moving conveyor 15 transports the individual boards toward the stacking station 13 but are stopped by a pair of opposing vertically moving stop pins 18 powered by pneumatic cylinders 19 and controlled by the processor (not shown).

The individual boards accumulate on the conveyor 15 behind the stop pins 18 until a first sensor 51 determines that a sufficient number of boards have been accumulated to form a layer of the stack to be created in the stacking station 13. At that point, a second pair of opposing vertical stop pins 38 is activated to push the next incoming board upwardly against the guide rail 17a to stop the continued advance of individual boards. Also at that point, the stick placement mechanism 50 can be operated to place a spacer stick (not shown) in a longitude orientation along the opposing sides of the accumulated layer of individual boards within the infeed station 12. One skilled in the art will recognize that spacer sticks are not added to every layer of boards, and thus the processor (not shown) activates the stick placement mechanism 50 after a predetermined number of layers have been added to the stack. Once the spacer sticks have been placed on the accumulated layer of boards, the first stop pins 18 are retracted to allow the accumulated layer of boards to move into the stacking station 13.

Once in the stacking station, a pair of vertical stops 55 is in an inboard position to stop the continued movement of the accumulated layer of boards beyond the stacking station 13. In addition, a pair of weighted stops 59 are pivotally connected to the frame 11 and positioned in line with the spacer sticks that could be on top of the new layer of boards entering the stacking station 13. When the boards are stopped by the vertical stops 55, the weighted stops 59 prevent the spacer sticks from continued movement. Once the stack has been completed and is to be moved into the staging station 14, the weighted stops 59 pivot to allow the stack of boards to move into the staging station 14. Sensors 52, 53 are used to determine if a full accumulated layer of boards have been moved into the stacking area. The stacking members 20 are then utilized to elevate the accumulated layer of boards into the stack of boards being built, as is described in greater detail below. After the accumulated layer of boards have passed the first pair of stop pins 18, the first pair of stop pins 18 are raised to stop the movement of the first individual board, while the second pair of stop pins 38 are retracted to allow the movement of individual boards toward the stacking station 13.

The staging station 14 is provided with a second chain conveyor 16 having opposing runs to carry a completed stack of lumber to the end of the staging station 14 where a fork lift or other apparatus can be utilized to remove the completed stack of lumber from the staging station 14 to a remote location. The second conveyor 16 is not operated continuously, as is the first conveyor 15, but is powered by large electric motors to affect movement of the heavy completed stack of lumber. The first and second conveyors 15, 16 overlap in the stacking station 13 with the second conveyor 16 being located inboard of the first conveyor 15. As will be described in greater detail below, the stack that is being built within the stacking station 13 is rested on the second conveyors 16 when the stack holders 22 are cycled through the down stroke to pick up the recently delivered accumulated layer of boards to be added to the underside of the stack being built.

Figure 10:
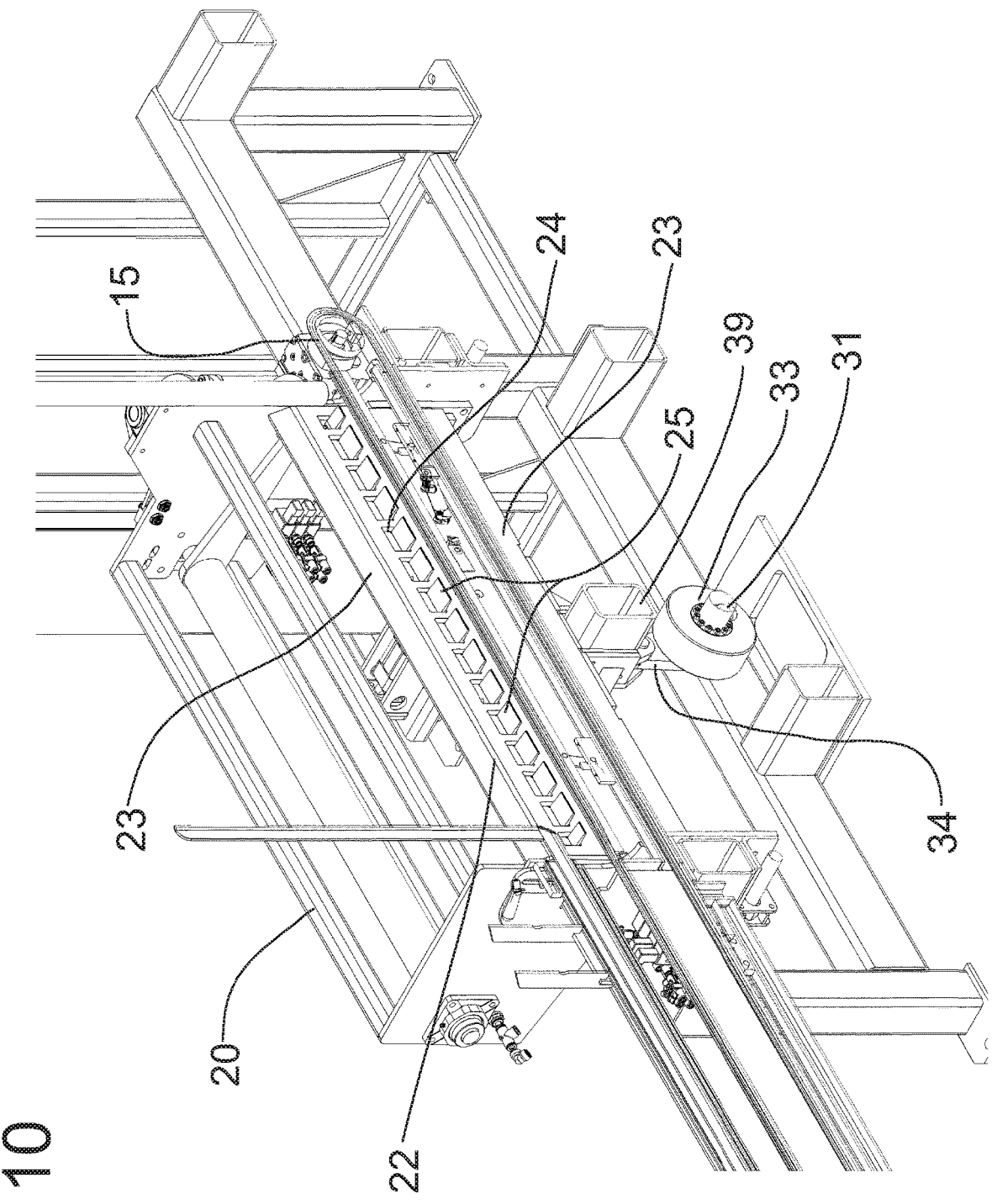
FIG. 10 is a partial, enlarged longitudinal cross-sectional view shown in perspective and corresponding to lines 10-10 of FIG. 4 to show the stacking members with extended stacking fingers.
Figure 10A:
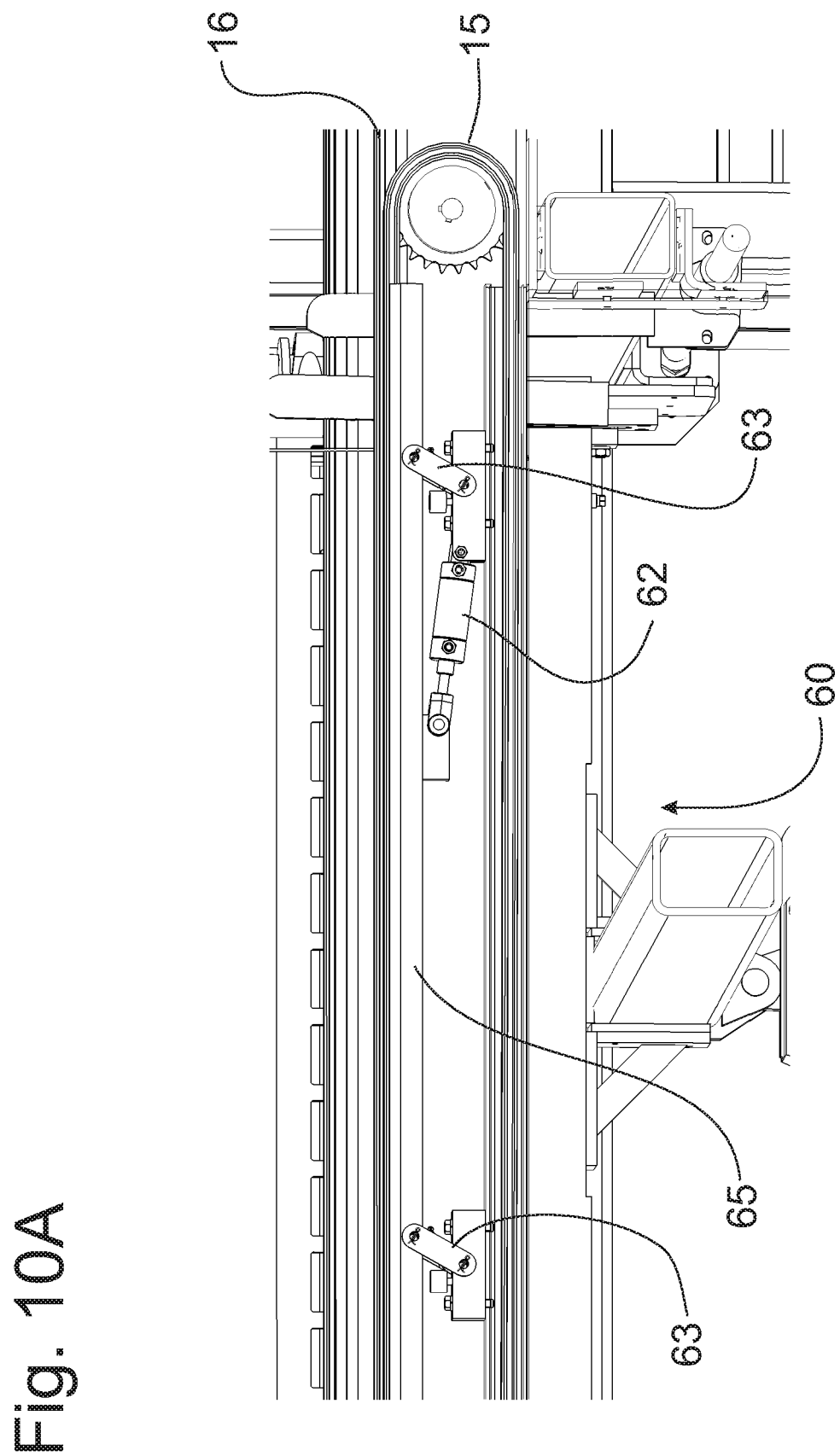
FIG. 10A is a partial cross-sectional view shown in elevation and corresponding to lines 10-10 of FIG. 4 to show the staging conveyor.

As is best seen in FIG. 10A, the first conveyor 15 is provided with a relief mechanism 60 to prevent the first conveyor 15 from carrying the load of a stack of boards. Since the first conveyor 15 is continuously operated within the stacking area, the sudden loading of the first conveyor 15 with the weight of the stack of boards being placed on top of the accumulated layer of boards, as will be described in greater detail below, will likely cause the drive for the first conveyor to stall or possibly be damaged. Since the second conveyor 16 is not run continuously and overlaps the first conveyor 15 in the stacking station 13, the second conveyor 16 can be used to support the load of the stack being built. The relief mechanism 60 includes a guide bar 65 supported on a four-bar linkage 63 and connected to a linear actuator 62 to affect movement of the guide bar 65.

When the stack being supported by the stacking members 20 is being placed on top of the accumulated layer of boards, as will be described in greater detail below, which accumulated layer of boards having been moved into the stacking station 13 by the first conveyor 15 (including both opposing runs), the portion of the first conveyor run 15 within the stacking station 13 is lowered by retracting the linear actuator 62 to pull the guide bar 65 downwardly with the four-bar linkage 63 providing parallel movement of the guide bar 65. The first conveyor 15 is captured by the guide bar 65 and is thus lowered when the guide bar 65 is lowered. As a result, the stack is then rested briefly on the opposing runs of the non-moving second conveyor 16. When the stack holders 22 again raise the now building stack, the actuator 62 is extended to return the runs of the first conveyor 15 into an effectively operating position. One skilled in the art will recognize that other measures can be utilized to provide the same end result, i.e. keep the weight of the stack of boards off of the continuously running conveyor 15. One such alternative measure would be to raise the second conveyor 16 to receive the stack during the down stroke of the eccentric 33, instead of lowering the first conveyor 15.

In operation, the lateral spacing of the chain conveyors 15, 16, and the opposing stacking members 20 is selected to correspond to the length of the lumber products to be received at the infeed station 12 and formed into a stack in the stacking station 13. The lumber products (not shown) are received on the conveyor chains 15 at the infeed station 12 in a conventional manner with the length of the boards spanning the opposing conveyor chains 15 and overlapping same. Guides 17 at the beginning of the infeed conveyor 15 center the incoming boards on the conveyor 15 for presentation to the stacking station 13. A pair of opposing stop pins 18 is vertically movable to intersect the incoming boards between the infeed station 12 and the stacking station 13. The stop pins 18 are powered by linear actuators 19, such as pneumatic cylinders.

The first layer of boards is collected in the infeed station 12 due to the upwardly projecting stop 18 until the sensor 51 signals that a sufficient number of boards have been accumulated on the infeed station 12 to constitute a layer or course of the stack. At that time, the stop pins 38 are raised to stop movement of boards along the infeed station 12 and the stop pins 18 are lowered to allow the continuously running conveyor 15 to move the accumulated layer into position in the stacking station. A pair of opposing upright stops 55 is located at the end of the stacking station 13 to provide a positive stop position for the incoming layer of boards into the stacking station 13. The stops 55 are movable laterally when the stack has been completed, but otherwise remain inboard of the respective stacking members 20. To affect lateral movement of the vertical stops 55, each vertical stop 55 is mounted on a bell crank 56 that is connected to a horizontally disposed linear actuator 57.

The stacking members 20 start with the stacking fingers 25 protruded inwardly toward and positioned below the layer of boards on the stacking station 13. At this point, the eccentric drive 30 has the subframe 23 of the stack holders 22 at the lowermost position. Then when the eccentric 33 rotates, the arms 34 push the lift beam 39, and thus the subframes 23, upwardly. Since the stacking fingers 25 are below the opposing ends of the boards, the entire layer is raised vertically with the stack holders 22 and held in an elevated position by the stack holders 22.

Meanwhile, the stop 18 was raised to accumulate a subsequent layer of boards. With the previous layer of boards elevated above the conveyors 15, 16 in the stacking station 13, the conveyor 15 can move the subsequent layer of boards into the stacking station 13. The continued movement of the eccentric drive mechanism 30 through the down stroke, places the previous layer of boards on top of the subsequent layer of boards just positioned within the stacking station 13. As the eccentric drive 30 continues through the down stroke lowering the collected stack of boards, the stacking fingers 25 engage the top of the subsequent layer of boards waiting to join the accumulated stack of boards. As the stack holders 22 continue to move downwardly, the stacking fingers 25 move upwardly relative to the subframe 23 because the stacking fingers 25 cannot pass through the boards of the subsequent layer.

At this point, the relative movement between the stacking fingers 25 and the subframe 23 causes the switch 26 to break contact. As a result, the linear actuators 27 retract the stacking fingers 25 from the stack, allowing the stacking fingers 25 to lower into position on the subframe 23. The lowering of the stacking fingers 25 re-establishes contact in the switch 26 causing the linear actuators 27 to extend the stacking fingers 25 back through the finger openings 24 which by this time locates the stacking fingers 25 below the subsequent layer of boards. The up stroke of the eccentric drive 33 pushes the stack holders 22 back upwardly with the stacking fingers 25 lifting the partially formed stack into an elevated position to allow a new subsequent layer of boards to enter into the stacking station 13 below the partially formed stack. As noted above, the lowering, and then subsequent raising, of the runs of the first conveyor 15 within the stacking station 13 is accomplished automatically in coordination with the operation of the stack holders 22, stacking fingers 25 and the eccentric drive 30.

The above-described process is repeated until the stack of boards has grown to a predetermined height, or has attained a predetermined number of courses. At this point, the stops 18 are again raised to accumulate a layer of boards in the infeed station 12 and the stacking members 20 are lowered by the eccentric drive 30 with the stacking fingers 25 disengaged from the stack and positioned below the lowermost layer of boards in the stack. The vertical stops 55 are retracted by the linear actuators 57 and the conveyor 16 is engaged to move the completed stack of boards from the stacking station 13 into the staging station 14. Once in the staging station 14, the completed stack of boards can be removed from the machine 10, such as by a fork lift (not shown).

Once the completed stack has moved fully into the staging station 14, the vertical stops 55 are returned to their inboard position to stop the incoming first layer of accumulated boards from the infeed station 12 into the stacking station 13 and re-start the process of creating a new stack of boards, as is described above. In situations where the board length is going to change, the spacings between the stacking members 20, and the conveyors 15, 16, can again be adjusted as described above to set the equipment in the proper position for working. Spacing variations on this lumber stacking machine 10 can vary to accommodate boards that are from about four feet long to about twenty-four feet long.

Figure 13:
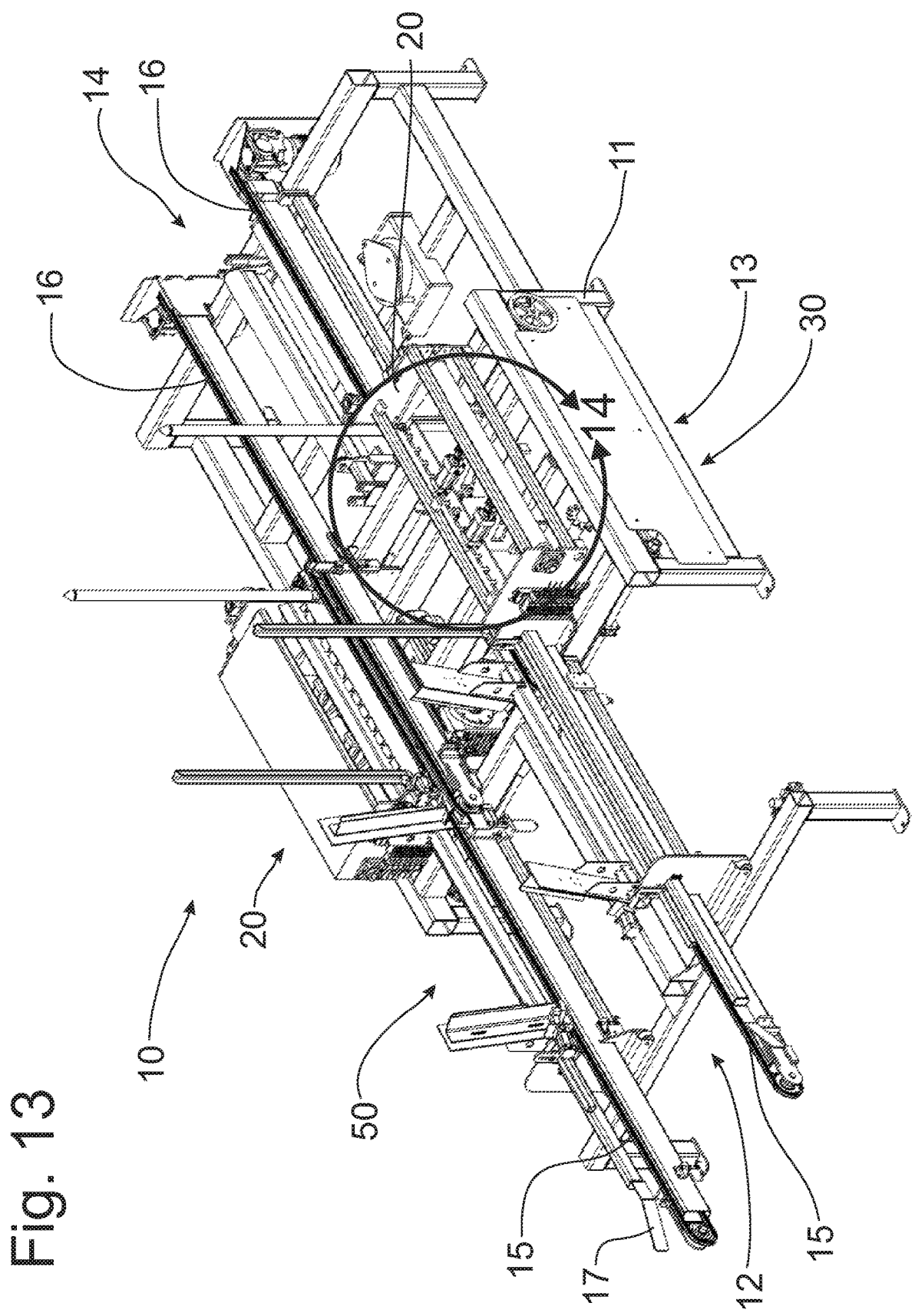
FIG. 13 is a perspective view of a lumber stacking machine incorporating the principles of the instant invention but depicting an alternative embodiment of the invention.
Figure 14:
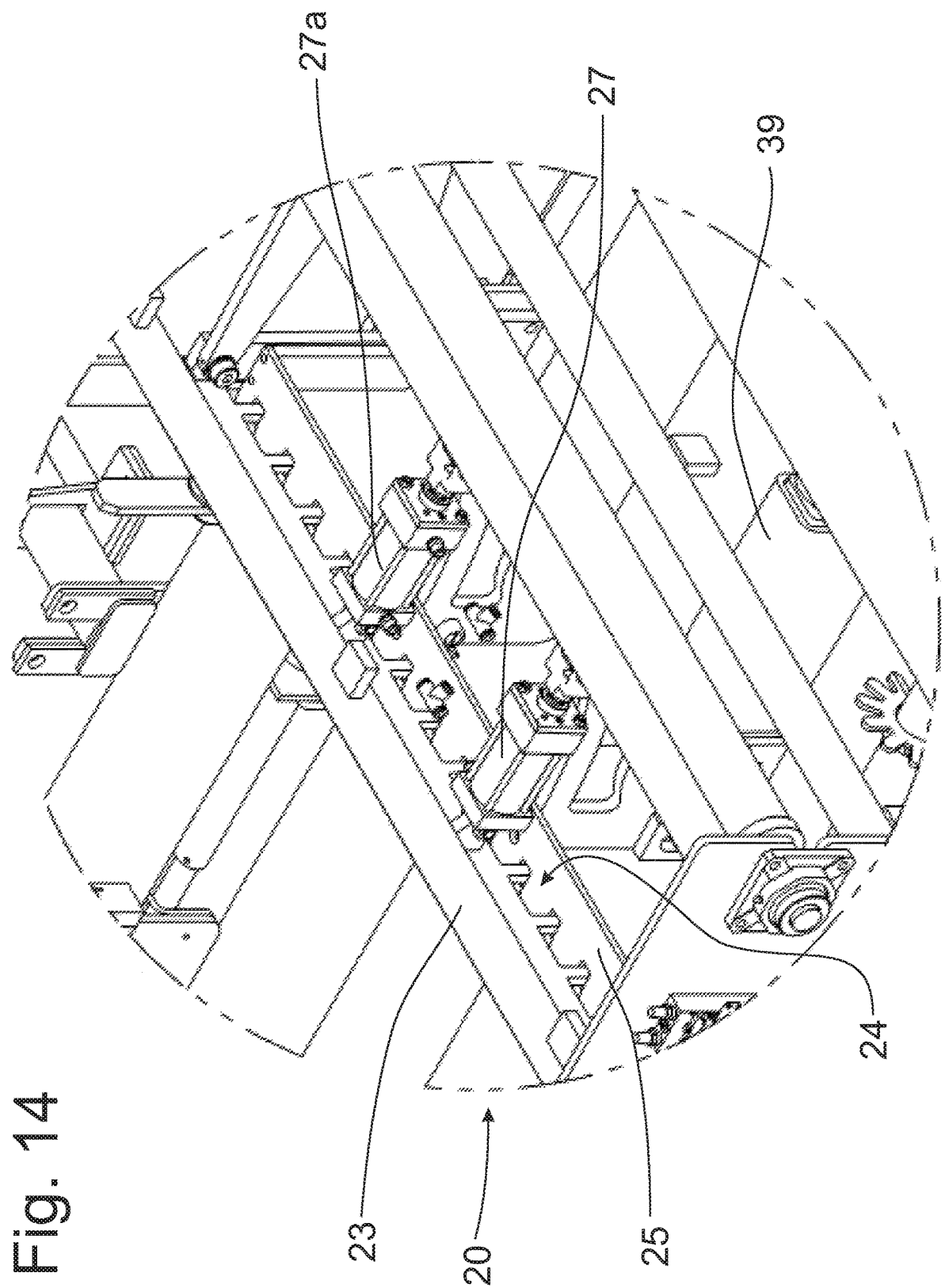
FIG. 14 is an enlarged partial perspective view of the stacking mechanism corresponding to the circle 14 in FIG. 13.

Referring now to FIGS. 13 and 14, an alternative embodiment of the instant invention can be seen. Because of the significant weight of the growing stack of lumber being supported by the stacking members 20 and particularly the friction between the stacking fingers 25 and the stack of lumber supported thereon, the power to move the stacking fingers 25 in and out to acquire a new layer of boards as is described in greater detail above, the power required to affect movement of the stacking fingers 25 increases with each layer added to the growing stack. Accordingly, an alternative configuration of the lumber stacking machine 10 could include a pair of hydraulic cylinders 27, 27a that power the lateral movement of the stacking fingers 25.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

In the way of examples, the eccentric drive mechanism 30 could be operated on demand by a microprocessor-type of control mechanism (not shown), or the drive could be operated at a speed that would be continuous yet matched to the volume of boards entering the infeed station 12.

Having thus described the invention, what is claimed is:

1. A stacking machine comprising:
   an infeed station for receiving a supply of product consisting of individual product units to be configured into a stack of product, said infeed station including a first conveyor run that moves the individual product units linearly;
   a stacking station positioned to receive the individual product units and form said stack of product, said first conveyor run extending into said stacking station;
   a pair of opposing stacking members positioned in said stacking station on opposing sides of said first conveyor run, each said stacking member including:
      a vertically movable stack holder having a vertically movable frame member supporting a plurality of laterally movable stacking fingers selectively movable into engagement with said individual product units;
      a drive mechanism for powering the vertical movement of said stack holders and for powering the lateral movement of said stacking fingers, said drive mechanism including linear actuators engaged with said stacking fingers to project said stacking fingers horizontally beneath said individual product units and permit a vertical movement of said individual product units with the vertical movement of said stack holders, and said linear actuators being operable to power the horizontal retraction of said stacking fingers relative to said frame member from engagement with said individual product units when said drive mechanism lowers said stack holders toward said first conveyor run such that said stacking fingers retract into said vertically movable frame member in response to said stacking fingers engaging a newly formed layer of said individual product units in said stacking station, said stacking fingers remaining retracted until passing beneath said newly formed layer of said individual product units and reaching a lowermost position so that said linear actuators will power the movement of said stacking fingers beneath said newly formed layer of individual product units delivered to said stacking area while said stack holders were in an uppermost position;

a staging station to receive a completed product stack from said stacking station, said staging station having a second conveyor run extending from said stacking station into said staging station and being selectively operable to convey a completed stack into said staging station, said first and second conveyor runs overlapping in said stacking station, said stacking station including a pair of opposing vertical stops that are operable in an inboard position to prevent individual product units from moving past said stacking station, and operable in an outboard position to permit passage of said completed product stack into said staging station, said infeed station including a pair of vertically movable stops to prevent movement of individual product units from said infeed station into said stacking station when in a raised position, and to allow movement of said individual product units into said stacking station when in a lowered position;

a relief mechanism associated with the first conveyor run to retract said first conveyor run within said stacking station when said stack holders are lowered to engage said newly formed layer of individual product units within said stacking station so that said stack of layers of individual product units being formed is supported on said second conveyor run instead of said first conveyor run; and a spacing adjustment mechanism for affecting movement of said conveyor runs and said stacking members laterally to vary the spacing therebetween and accommodate different length dimensions of product units.

2. The stacking machine of claim 1 wherein said first conveyor run is operated continuously to move said individual product units toward said stacking station, said second conveyor run being selectively operable.

3. A lumber stacking machine comprising:
an infeed station, a stacking station and a staging station;
a first conveyor operable to move individual pieces of lumber from said infeed station into said stacking station to form a layer of said individual pieces of lumber in said stacking station with said individual pieces of lumber being oriented in parallel orientations;
a second conveyor selectively operable to move a stack of lumber from said stacking station to said staging station, said first and second conveyors overlapping in said stacking station, said first conveyor incorporating a relief mechanism to retract said first conveyor within said stacking station when said stack of lumber is lowered to engage said layer of individual pieces within said stacking station so that said stack of lumber is supported on said second conveyor instead of said first conveyor; and
a stacking mechanism operable in said stacking station to form said stack of lumber from subsequent layers of individual pieces of lumber conveyed into said stacking station, said stacking mechanism being operable to elevate a newly formed layer of lumber into a stack of lumber vertically elevated above said stacking station such that said stack of lumber is formed from the bottom side until completed so that said second conveyor can transport said completed stack of lumber to said staging station, said stacking mechanism including a pair of opposing stack holders operably connected to a drive mechanism for simultaneously reciprocating said stack holders vertically, each said stack holder having a plurality of stacking fingers selectively movable between extended and retracted positions by linear actuators engaged with said stacking fingers to power horizontal movement thereof, said stack holders also being vertically movable to elevate a stack of lumber above said stacking station while a new layer of individual pieces of lumber is being formed on said stacking station, and a control mechanism for initiating the operation of said relief mechanism in response to a predetermined movement of said stack holders, said stacking fingers being extended to engage a lowermost layer of lumber of said elevated stack of lumber, and retracted when said stack holders are lowered to add said newly formed layer of lumber to allow said stack holders to pass below said newly formed layer of lumber, said relief mechanism being operable to lower said first conveyor when said completed stack of lumber is placed upon said stacking station to enable said selectively operable second conveyor to move said completed stack of lumber from said stacking station to said staging station.

4. The lumber stacking machine of claim 3 further comprising a spacing adjustment mechanism for affecting movement of said conveyor runs and said stack holders laterally to vary the spacing therebetween and accommodate different length dimensions of said individual pieces of lumber being conveyed into said stacking station by said first conveyor.

5. The lumber stacking machine of claim 3 wherein said stacking station further includes a pair of opposing vertical stops that are operable in an inboard position to prevent individual product units from moving past said stacking station, and operable in an outboard position to permit passage of said completed product stack into said staging station.

6. The lumber stacking machine of claim 3 wherein said infeed station includes a pair of vertically movable stops to prevent movement of said individual pieces of lumber from said infeed station into said stacking station when in a raised position, and to allow movement of said individual product units into said stacking station when in a lowered position.

7. The lumber stacking machine of claim 3 wherein said first conveyor is operated continuously, while said second conveyor is operated selectively when said completed stack of lumber is to be conveyed to said staging station.

8. A lumber stacking machine comprising:
an infeed station having a first conveyor continuously operable to move individual pieces of lumber along a path of movement;
a stacking station in which said first conveyor terminates so as to deliver said individual pieces of lumber in an orientation transverse to said path of movement from said infeed station to form a layer of lumber within said stacking station, said stacking station supporting the beginning of a second conveyor selectively operable to move a completed stack of lumber from said stacking station, said first and second conveyors overlapping in said stacking station, said stacking station further having a pair of opposing stacking members operable to hold a partially formed stack of lumber vertically above said stacking station while said layer of lumber is being formed, and sequentially move a plurality of subsequently formed completed layers of lumber onto a bottom portion of said partially formed stack of lumber to create said completed stack of lumber, each said stacking member including a pair of opposing stack holders, each said stack holder having a plurality of stacking fingers operably connected to a pair of linear actuators to selectively move said stacking fingers horizontally between extended and retracted positions, said stack holders being vertically movable to elevate a stack of lumber above said stacking station while a new layer of individual pieces of lumber is being formed on said stacking station, said linear actuators being operable to extend said stacking fingers to engage a lowermost layer of lumber of said elevated stack of lumber, and to retract said stacking fingers when said stack holders are lowered to add said newly formed layer of lumber to said partially formed stack of lumber, said stacking station including a relief mechanism operable to lower said first conveyor when said completed stack of lumber is placed upon said stacking station to enable said second conveyor to move said completed stack of lumber from said stacking station to said staging station, said relief mechanism being operable to retract said first conveyor below said second conveyor within said stacking station, said second conveyor being operated selectively when said completed stack of lumber is to be conveyed to said staging station; and a staging station supporting a terminus of said second conveyor to receive said completed stack of lumber from said stacking station.

9. The lumber stacking machine of claim 8 further comprising a spacing adjustment mechanism for affecting movement of said conveyor runs and said stack holders laterally to vary the spacing therebetween and accommodate different length dimensions of said individual pieces of lumber being conveyed into said stacking station by said first conveyor.

10. The lumber stacking machine of claim 8 further comprising:

a pair of opposing vertical stops in said stacking station that are operable in an inboard position to prevent individual product units from moving past said stacking station, and operable in an outboard position to permit passage of said completed product stack into said staging station; and a pair of vertically movable stops in said infeed station to prevent movement of said individual pieces of lumber from said infeed station into said stacking station when in a raised position, and to allow movement of said individual product units into said stacking station when in a lowered position.

* * * * *